US006731633B1

(12) United States Patent
Sohor et al.

(10) Patent No.: US 6,731,633 B1
(45) Date of Patent: May 4, 2004

(54) NETWORK UNIT INCLUDING ADDRESS HASHING

(75) Inventors: Annette E Sohor, Dublin (IE); Eoin O'Brien, Dublin (IE); Neil J Clifford, Dublin (IE); Derry M O'Donoghue, Dublin (IE)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/556,788

(22) Filed: Apr. 25, 2000

(30) Foreign Application Priority Data

Mar. 1, 2000 (GB) .............................................. 0004738

(51) Int. Cl.[7] .............................................. H04L 12/28
(52) U.S. Cl. ..................................................... 370/392
(58) Field of Search .......................... 370/392, 395.32, 370/401, 466, 402, 389

(56) References Cited

U.S. PATENT DOCUMENTS

| | | | | | |
|---|---|---|---|---|---|
| 5,475,826 | A | * | 12/1995 | Fischer ........................... | 707/1 |
| 5,914,938 | A | * | 6/1999 | Brady et al. ................. | 370/254 |
| 6,173,384 | B1 | * | 1/2001 | Weaver ....................... | 711/216 |
| 6,233,242 | B1 | * | 5/2001 | Mayer et al. ................. | 370/412 |
| 6,292,483 | B1 | * | 9/2001 | Kerstein ....................... | 370/389 |
| 6,424,650 | B1 | * | 7/2002 | Yang et al. .................. | 370/390 |
| 6,473,424 | B1 | * | 10/2002 | DeJager et al. ............. | 370/389 |
| 6,504,843 | B1 | * | 1/2003 | Cremin et al. ............... | 370/389 |
| 6,553,029 | B1 | * | 4/2003 | Alexander ................... | 370/389 |

FOREIGN PATENT DOCUMENTS

EP         483424 A1 * 5/1992 ........... G06F/15/40
EP         953919 A1 * 11/1999 ........... G06F/17/30

OTHER PUBLICATIONS

Jain, Raj. "A Comparison of Hashing Schemes for Address Lookup in Computer Networks". IEEE Transactions on Communications. Oct. 1992. vol. 40. No. 10. pp. 1570–1573.*

Tung–Shou, Chen et al. "Hash–Semijoin: a New Technique for Minimizing Distributed Query Time". Proceedings of the Third Workshop on Future Trends ofDistributed Computing Systems. Apr. 1992. pp. 325–330.*

* cited by examiner

*Primary Examiner*—Chau Nguyen
*Assistant Examiner*—Donald L Mills
(74) *Attorney, Agent, or Firm*—Nixon & Vanderhye PC

(57) ABSTRACT

A network unit includes a forwarding database which includes entries relating packet addresses to forwarding data and is operative to form linked chains of entries wherein the entries in a chain represent different packet addresses which are reduced by hashing to the same pointer for the database. A seed for a hashing algorithm is provided by a combination, such as an exclusive-OR combination, of part of an input address word and a selected word. Hashing is preferably performed in at least two cycles, wherein in one cycle a hash function is applied to a portion of the input address not including the part which is combined with the selected word to constitute a hash seed and in another (preceding) cycle a further part of the address and the aforementioned hash seed are subject the hash function. The selected word may be a software programmable mask and it is possible thereby to ensure a high degree of randomness in the hash seed and to reduce the incidence of convergence of different addresses to a common pointer.

8 Claims, 3 Drawing Sheets

NETWORK UNIT INCLUDING ADDRESS HASHING

FIELD OF THE INVENTION

This invention relates to network units for use in a packet-based communication system wherein network units such as switches and routers respond to address data in address data packets to direct packets towards their intended destinations. The invention particularly though not exclusively concerns the hashing of media access control addresses to facilitate the establishment and use of a forwarding database.

BACKGROUND TO THE INVENTION

It is well known in for example network units which are otherwise termed switches, bridges and routers to provide a forwarding database which is accessed employing address data within a receive packet and yields forwarding data such as a port number enabling a switching engine to direct the packet to an appropriate port from which the packet may be dispatched. Neither the particular nature of the address data, which is typically layer 2 or media access control data, nor the particular forwarding data, typically port numbers, is of direct importance to the invention. Nevertheless the invention will be described in relation to the employment of media access control data.

Although the establishment of a forwarding database is not of particular importance to the invention, it may be noted that it is customary to establish a forwarding database by the reading of a source address from an incoming packet and to determine whether that source address corresponds to an address which is already established as an entry in the forwarding database. If the source address is not matched in this way, a new entry is made in the database.

It is also well known to employ the destination address, in a manner to be described, to access the database in order to obtain the forwarding data. If the destination address is not in the database then it may be necessary to broadcast the packet and to detect a response from the intended recipient, in order to establish, for example, from which port it is necessary to forward the packet in order to direct the packet to the correct destination.

In order to make the establishment of a forwarding database and also look-ups in the database more efficient, for example in terms of memory space to be occupied, it is known, for example from U.S. Pat. No. 5,708,659 and GB patent application No. 2337674 to employ a hashing algorithm. The main purpose of hashing is to reduce a very wide address into a much less wide address. For example, it may be employed to reduce a 48-bit wide media access control address into a 16-bit wide address. The result of hashing may be a pointer to an associated data table which includes the original MAC address and other data such as the forwarding data.

Since the hashing of address data into a pointer does not necessarily produce a unique result, it is customary to organise the associated data table so that if a second MAC address hashes to the same result the entry relating to the first MAC address is caused to contain a link pointer to a new entry for the second MAC address. During a look-up process, if the stored MAC address which is returned from the associated data table does not match the input MAC address then the link pointer will direct a search engine to the next linked entry in the associated data table which might have a MAC address that matches the input MAC address and so on. The phenomenon of the same hash result from different original addresses is called 'convergence'.

Although the use of linked lists is a necessary feature of look-up tables which are accessed by hashing, it is not desirable that linked lists be produced, since they significantly retard the look-up process.

SUMMARY OF THE INVENTION

The present invention relates to the improvement of the hashing process so as to reduce the incidence of convergence and the consequent occurrence of linked lists.

In a preferred form of the present invention, a seed for a hashing algorithm is provided by a combination, such as an exclusive-OR combination, of part of an input address word and a selected adjustable auxiliary word. Hashing is preferably performed in at least two stages, wherein in one cycle a hash function is applied to a portion of the input address not including the part which is combined with the selected word to constitute a hash seed and another (preceding) cycle in which a further part of the address and the aforementioned hash seed are subject to hashing. The selected word may be a software programmable mask and it is possible thereby to ensure a high degree of randomness in the hash seed. With appropriate adjustment of the mask, convergence can readily be reduced. More particularly the invention allows up to $2^n-1$ permutations of the hash algorithm. With such a range of permutations it should always be possible to find an optimal hash algorithm for a given database.

Further features of the invention will be apparent from the following drawings.

DETAILED DESCRIPTION OF AN EXAMPLE OF THE INVENTION

Figure 1:
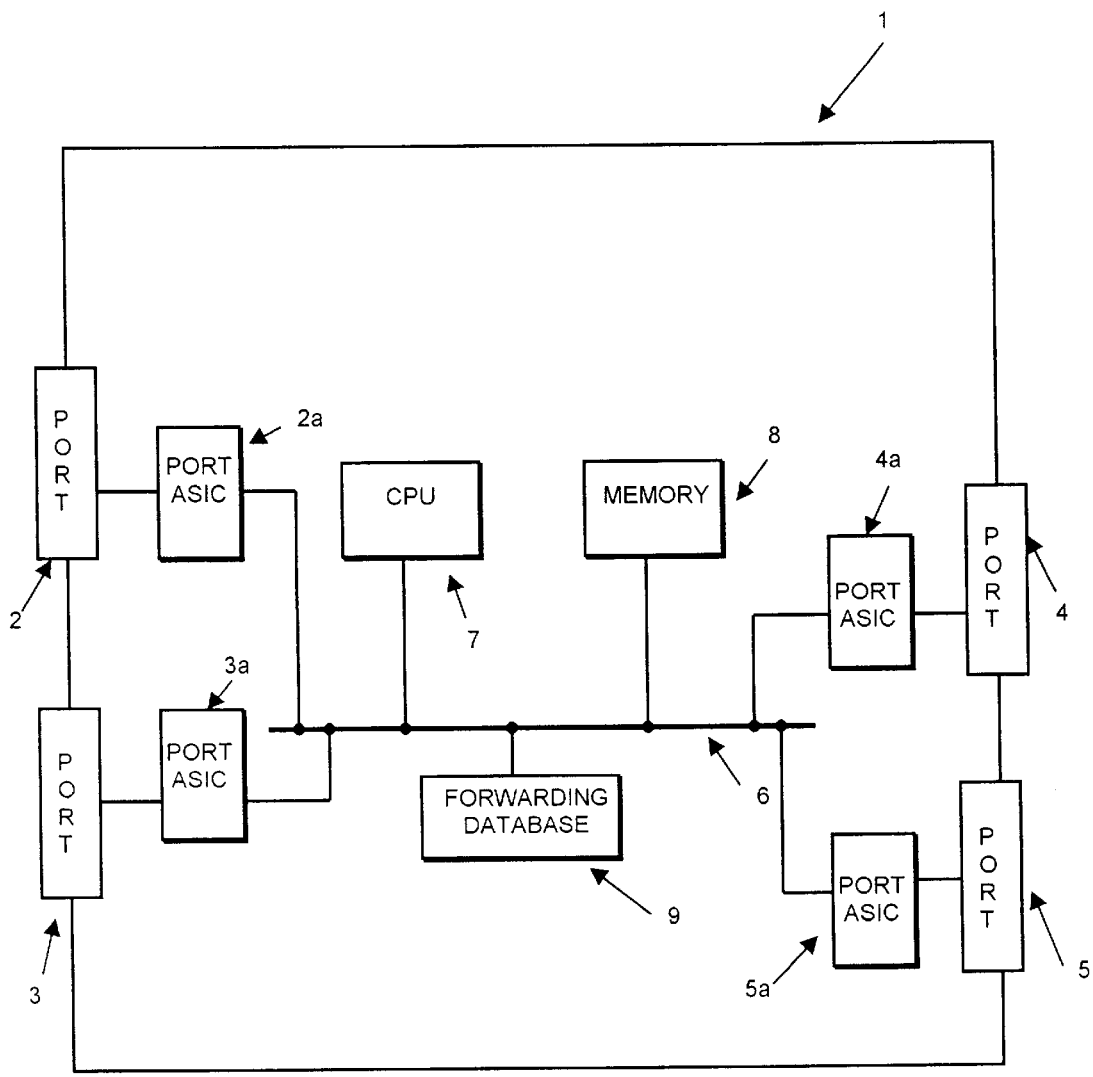
FIG. 1 illustrates schematically a switch of the general kind in which the invention may be employed.

FIG. 1 illustrates by way of example the general architecture of a switch in which the invention may be employed. The example in FIG. 1 is given by way of completeness and it is not intended to limit the invention to any particular construction or manner of operation of a switch or router. Typically, a switch, such as a layer 2 switch or bridge may have a substantial multiplicity (such as 28) ports by which addressed packets may be received and from which addressed packets may be forwarded. In the present, simplified example, a switch 1 is shown as having four ports 2, 3, 4 and 5. Each of the ports is associated with a respective port ASIC 2a, 3a, 4a and 5a respectively. It should be understood that the port ASICs which have been shown explicitly separately in FIG. 1 may be part of a single large ASIC. The port ASICs generally contain the media access control devices and the physical layer devices (MACs and PHYs) necessary for performing customary formatting and translation functions. The switch 1 includes a bus system, shown in simplified form by a bus 6, enabling the conveyance across the switch of packet data, control data and status data in known manner. Coupled to the bus system is a memory 8 for the (temporary) storage of packets. Typically the memory may contain lists of pointers, organised into port by port traffic queues so that the packets which are received by a particular port are identified by pointers in a respective queue and the packets which are to be transmitted from any given port are identified by pointers in a respective transmit queue, the pointers pointing to relevant locations in memory 8. The switch also includes a forwarding database which is in customary form containing entries which relate destination addresses to forwarding data such as port numbers. The forwarding database is preferably organised as is more particularly described with reference to FIG. 2. The memory 8 and forwarding database 9 are controlled by a switching engine and a forwarding engine. These may be provided in hardware but for the sake of simplicity are shown in FIG. 2 as being constituted by a central processing unit 7 operating on programs which may be stored in a respective part of memory 8.

It is possible, though not preferred in the current state of the art, to organise the forwarding database so that it is accessed directly by a media access control address of a packet. Since media access control addresses are quite wide (48 bits) it is generally preferred according to the state of the art to employ hashing of the address so as to reduce the address data to a shorter length which is used to access a pointer table itself employed to identify relevant data blocks in the forwarding database, the data blocks containing Ethernet MAC addresses.

Figure 2:
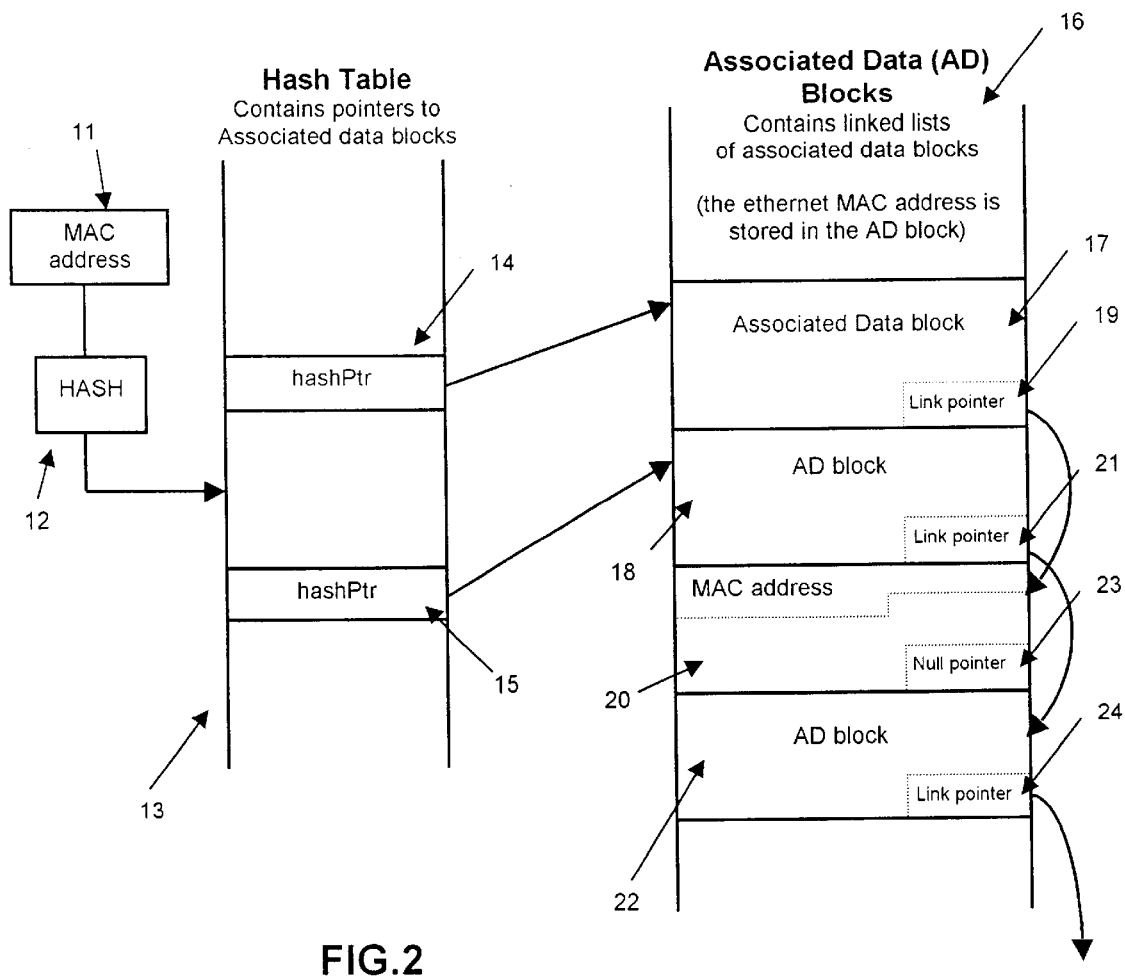
FIG. 2 illustrates schematically the organisation of a forwarding database controlled by a hashing function.

FIG. 2 illustrates a typical organisation of the forwarding database. A MAC address in a register 11 is subject to a hashing operation, denoted by 'hash' 12 so as to provide a pointer in a hash table 13. Two hash pointers are shown at 14 and 15. These point to a block in an associated data table 16. More particularly, hash pointer 14 is shown as pointing to associated data block 17. This associated data block will contain the original MAC address and the relevant forwarding data. Likewise, hash pointer 15 points to associated data block 18.

The phenomenon of 'convergence' describes the hashing of different MAC address to the same hashed address. Thus associated data block 17 may not be the one that contains the only MAC address corresponding to the hash pointer 14. If this is so, then as the table is compiled, there are formed linked lists or chains of associated data blocks wherein the blocks in a chain have respective MAC addresses but are linked because those MAC addresses will hash to the same hash pointer. The blocks in the associated data table are linked by means of link pointers, so that for example link pointer 19 in associated data block 17 points to associated data block 20 and link pointer 21 in associated data block 18 points to associated data block 22.

Although it is not directly relevant to the present invention, when a look up is performed in a forwarding database containing chains of linked associated data blocks, it is necessary, when accessing the associated data block to make a comparison between the MAC address which is part of that entry and the MAC address which has been hashed to access that associated data block. If the two match, then the forwarding data is retrieved. If the two do not match it is necessary to examine the next associated data block in the chain. Thus if the MAC address in associated data block 17 does not match the MAC address in register 11, the look-up engine needs to be directed by link pointer 19 to associated data block 20 to compare the MAC address in associated data block 20 with the MAC address in register 11 and so on down the chain until an address match is found. If the associated data table is the last in the chain, it will contain a null pointer (23). If the associated data block is not the last in the chain, such as data block 22 to which link pointer 21 points, it will contain its own link pointer 24 to the next block in the chain.

Although the use of linked lists or chains of entries is necessary for operating a database which employs hashing of an address to reduce the address to some shorter length for accessing the database, the existence of linked chains necessarily slows the look-up process and it is desirable to avoid the convergence of a multiplicity of MAC addresses to the same hashed address (i.e. the same hash pointer).

Figure 3:
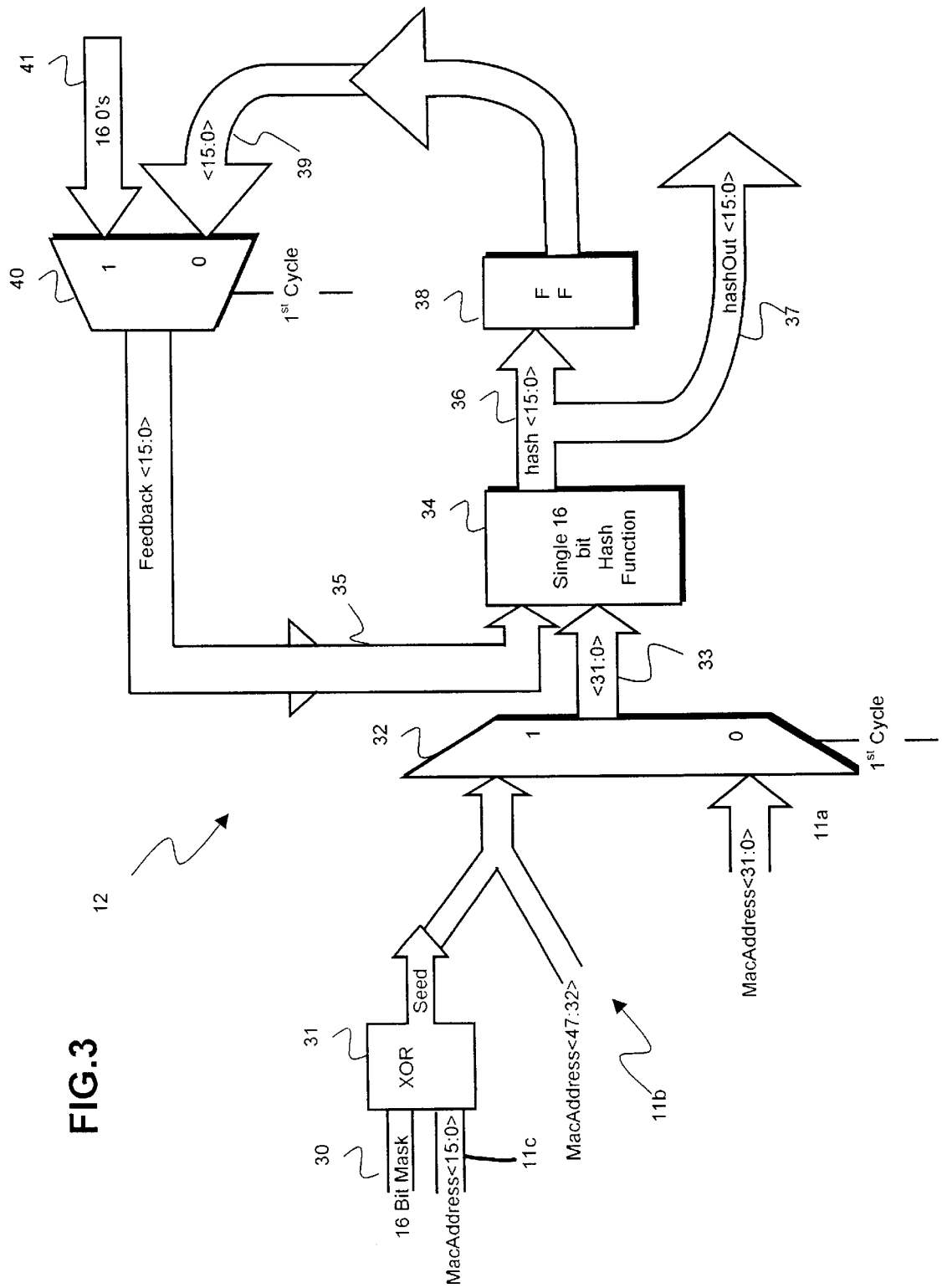
FIG. 3 illustrates the operation of a hashing algorithm according to the invention.

FIG. 3 illustrates schematically the operation of an improved hashing system wherein a hash seed is formed from a combination of an externally generated word or bit mask and part of the address which is being hashed, and the hash seed and the address are conjointly hashed.

More particularly, as shown in FIG. 3, the hashing function 12 operates on an address word which is partitioned into three parts of which two are preferably mutually exclusive (bits 47:32 and bits 31:0) and a third (bits 15:0) is part of one of those two. The least significant bits of the address, in this example bits 31:0, are denoted 11a. The rest of the MAC address (bits 47:32) is shown at 11b and a portion of the first part thereof (specifically bits 15:0) are shown at 11c. The bits of part 11a of the MAC address and a hash seed are applied to respective inputs of a selector stage 32. The hash seed is formed by a suitable combinatorial logic combination of a portion, in this case bits [15:0], of the input MAC address with a selected adjustable auxiliary word, in this case a 16-bit programmable bit mask 30. Preferably the combination is made by an exclusive-OR circuit 31 which forms an exclusive-OR combination of each bit of portion 11c with a respective bit of the mask. The output lines 33 of the selector stage are coupled to a hashing stage 34 which receives on lines 35 a 16-bit feedback value. Hashing stage 34 may implement a 16-bit CRC (cyclic redundancy code) function or a maximal length polynomial hash function. The output of the hash function 34 is a 16-bit output 36 which is coupled to a flip-flop register 38 during a first cycle and to an output 37 during a second cycle.

In a first cycle, the selector 32 selects a 32-bit input composed of the 16 top bits [47:32] of the MAC address in register 11b and the 16 bits formed by the exclusive-OR combination of the 16-bit mask 30 and the least significant portion (11c) of the MAC address (bits [15:0]); the hash function 34 operates on these 32 bits and 16 further bits (all zeros) provided by selector 40 from an all-zeros input 41. The 16-bit result of the first cycle is stored in flip-flop register 38.

In the second hashing cycle, the less significant portion 11a (bits 31:0) of the MAC address is selected by selector 32 and coupled to hashing function 34 along with the hash result 39 (selected by selector 40) of the first cycle. The final hash result is a 16-bit output 37, which may be used as a pointer as previously described.

The forming of the hash seed with bits of the MAC address should ensure a high degree of randomness in the hash seed and with appropriate programming of the mask register convergence can easily be reduced. The optimization allows many permutations of the hash algorithm. Furthermore, with such a range of permutations it should always be possible to find an optimal hash algorithm for a given database, in a real network this can be carried out as a background task by software. In particular the CPU may monitor the memory for linked lists, for example by detecting non-null pointers 19, 21 and 24. This monitoring will indicate a need to change the bit mask if, for example, the number of such link pointers exceeds a threshold.

The CPU may select the bit mask by any suitable algorithm, even randomly. Since however, changing the bit mask generally alters the hash result for any given MAC address, a change in the bit mask requires the database to be completely re-established. It would normally be preferable to run a simulation of a variety of traffic flows and test for the occurrence of convergence employing various bit masks, selecting for use the bit mask which produces the least convergence.

What is claimed is:

1. Apparatus for reducing a first digital word to an output word of substantially lesser width in bits than the first digital word, said first digital word comprising mutually exclusive first and second parts each consisting of a different multiplicity of bits of the first digital word, said apparatus comprising:

means for providing an adjustable auxiliary word;

combinatorial logic for combining said auxiliary word with a portion of one of said mutually exclusive parts of said first digital word to provide a seed word;

a hashing stage for hashing said seed word and a selected part of the first digital word; and a selector stage operative in one cycle to select for the hashing stage said seed word and said first part of the first word, said first part not including said portion, and operative in another cycle to select for the hashing stage said second part of said first word, said second part including said portion.

2. Apparatus according to claim 1 wherein said hashing stage has an input for receiving an output of the selector stage and a feedback word.

3. Apparatus according to claim 2 wherein said hashing stage provides a first output which constitutes said feedback word during said another cycle.

4. Apparatus according to claim 1 wherein said combinatorial logic provides exclusive-OR gating of bits of the auxiliary word with bits of said portion of said first digital word.

5. A network unit including:

a multiplicity of ports for receiving and forwarding addressed data packets;

a forwarding database which includes entries relating packet addresses to forwarding data; and apparatus for receiving a packet address as a first digital word for reducing a first digital word to an output word of substantially lesser width in bits that the first digital word, said first digital word having a plurality of mutually exclusive parts, said apparatus comprising:

means for providing an adjustable auxiliary word;

combinatorial logic for combining said auxiliary word with a portion of one of said mutually exclusive parts of said first digital word to provide a seed word; and means for hashing in successive cycles of operation said seed word with respective ones of said mutually exclusive parts of said first digital word to produce the said output word, only one of said mutually exclusive parts of said first digital word including said portion, said output word constituting a pointer to an entry in said forwarding database.

6. A network unit according to claim 5 wherein said database is operative to form linked chains of entries wherein the entries in a chain represent different packet addresses which are reduced by the means for hashing to the same output word and wherein the network unit includes means for detecting the existence of said linked chains to indicate a need to alter said adjustable auxiliary word.

7. A network unit according to claim 6 wherein said means for detecting is operative to alter said adjustable auxiliary word.

8. A network unit according to claim 5 wherein said portion consists of the sixteen least significant bits of a 48-bit media access control address, a first part consists of the sixteen most significant bits of said media access control address, and a second part consists of the thirty-two least significant bits of said media access control address, said auxiliary word being a 16-bit mask, and wherein said output word constitutes a 16-bit pointer.

* * * * *